(12) United States Patent
Shin et al.

(10) Patent No.: US 11,128,604 B2
(45) Date of Patent: Sep. 21, 2021

(54) ANONYMOUS COMMUNICATION SYSTEM AND METHOD FOR SUBSCRIBING TO SAID COMMUNICATION SYSTEM

(71) Applicant: Amenidy, Inc., Nagoya (JP)

(72) Inventors: Yoshihiro Shin, Nagoya (JP); Hiroshi Yasuda, Nagoya (JP); Katsuyuki Maeda, Nagoya (JP); Shouichi Nishimura, Nagoya (JP); Masanori Yamamura, Nagoya (JP)

(73) Assignee: Amenidy, Inc., Nagoya (JP)

( * ) Notice: Subject to any disclaimer, the term of this patent is extended or adjusted under 35 U.S.C. 154(b) by 693 days.

(21) Appl. No.: 15/772,985

(22) PCT Filed: Nov. 8, 2016

(86) PCT No.: PCT/JP2016/083048
§ 371 (c)(1),
(2) Date: Jan. 30, 2019

(87) PCT Pub. No.: WO2017/082233
PCT Pub. Date: May 18, 2017

(65) Prior Publication Data
US 2019/0149523 A1    May 16, 2019

(30) Foreign Application Priority Data
Nov. 10, 2015  (JP) .............................. JP2015-220480

(51) Int. Cl.
*H04L 9/32* (2006.01)
*H04L 29/06* (2006.01)
(Continued)

(52) U.S. Cl.
CPC .......... *H04L 63/0421* (2013.01); *G06F 21/62* (2013.01); *G06F 21/6254* (2013.01);
(Continued)

(58) Field of Classification Search
CPC combination set(s) only.
See application file for complete search history.

(56) References Cited

U.S. PATENT DOCUMENTS

2012/0284518 A1* 11/2012 Walker ................. H04L 9/3255
                                                      713/171
2013/0091352 A1*  4/2013 Patel .................. H04L 63/0823
                                                      713/156
2017/0366349 A1* 12/2017 Lyubashevsky ...... H04L 9/3006

FOREIGN PATENT DOCUMENTS

EP          1768304 A1       3/2007
JP       2002-163480 A       6/2002
(Continued)

OTHER PUBLICATIONS

Extended European Search Report, European Application No. 16864194.2, dated Apr. 24, 2019, 6 pages.
(Continued)

*Primary Examiner* — Olugbenga O Idowu
(74) *Attorney, Agent, or Firm* — Nelson Mullins Riley & Scarborough LLP; Anthony A. Laurentano

(57) ABSTRACT

[Problem] To provide an anonymous communication system which ensures anonymity, with which a user can be identified if necessary, and which has a high degree of social credibility. [Solution] A user computer 11 transmits to a management computer 21 electronically signed subscription application data signed using a first signature key capable of being used with another communication system. The management computer 21 verifies the electronic signature of the subscription application data using a first public key, and if the validity of the electronic signature can be verified, generates and encrypts a second signature key and transmits the encrypted second signature key to the user computer 11. The user computer 11 generates electronically signed receipt data that have been signed in duplicate using the first and
(Continued)

second signature keys, and transmits the receipt data to the management computer 21. The management computer 21 verifies the electronic signature of the receipt data using first and second public keys, and if the validity of the electronic signature can be verified, records user data including the receipt data in a recording unit 24.

18 Claims, 10 Drawing Sheets

(51) Int. Cl.
*G06F 21/62* (2013.01)
*G06F 21/64* (2013.01)
*G09C 1/00* (2006.01)
*H04L 9/30* (2006.01)

(52) U.S. Cl.
CPC .............. *G06F 21/64* (2013.01); *G09C 1/00* (2013.01); *H04L 9/30* (2013.01); *H04L 9/32* (2013.01); *H04L 9/3255* (2013.01); *H04L 9/3263* (2013.01); *H04L 2209/42* (2013.01)

(56) References Cited

FOREIGN PATENT DOCUMENTS

| | | |
|---|---|---|
| JP | 2003-141085 A | 5/2003 |
| JP | 2005-64791 A | 3/2005 |
| JP | 2007-267153 A | 10/2007 |
| JP | 2008-234321 A | 10/2008 |
| JP | 2010-114594 A | 5/2010 |
| WO | 2011/080874 A1 | 7/2011 |
| WO | 2013/190372 A1 | 12/2013 |

OTHER PUBLICATIONS

Anonymous: "Group signature—Wikipedia," Oct. 15, 2015, 1 pages, XP055579250, Retrieved from the Internet:URL: https://en.wikipedia.org/w/index.php?title=Group_signature&oldid=685873124 [retrieved on Apr. 9, 2019].

International Preliminary Report on Patentability, PCT/JP2016/083048, dated May 15, 2018, 8 pages.

International Search Report, PCT/JP2016/083048, dated Dec. 6, 2016, 2 pages.

\* cited by examiner

ANONYMOUS COMMUNICATION SYSTEM AND METHOD FOR SUBSCRIBING TO SAID COMMUNICATION SYSTEM

TECHNICAL FIELD

The present invention relates to an anonymous communication system capable of identifying users if necessary while users are anonymously communicating with each other.

BACKGROUND ART

Conventionally, establishment of a communication system in which users can safely communicate while authenticating the other party has been a critical problem for the existence of the Internet. As one solution to this problem, Public Key Infrastructure (Public Key Infrastructure, PKI; Non-Patent Literature 1), which is an authentication system that can be used in the Internet, has been widely used.

However, as information that identifies a user was always disclosed to the other party in a communication system using a public key infrastructure, it was impossible to perform authentication unless user identification information was presented even when it was not necessary. In view of that, Tor (Patent Literature 1), which is a communication with enhanced anonymity, and Simple Public Key Infrastructure (Patent Literature 2), which is a authentication system, have been in practical use, and technology for anonymous authentication using pseudonym communication and a group signature have been proposed.

CITATION LIST

Patent Literature

Patent Literature 1: Japanese Published Unexamined Patent Publication No. 2004-229071
Patent Literature 2: Japanese Published Unexamined Patent Publication No. 2008-278144

Non-Patent Literature

Non-Patent Literature 1: ITU-T Recommendation X.509 The Directory—Authentication Framework
Non-Patent Literature 2: IETF Request for Comments 2692 & 2693 Simple Public Key Infrastructure

SUMMARY OF THE INVENTION

Problem to be Solved by the Invention

However, in anonymous communication based on a Simple Public Key Infrastructure, pseudonym signatures, or group signatures, no method exists for participation in a communication system while remaining anonymous, so that one's identify must be revealed at the time of participation even though anonymity is ensured along the communication path and to the other party of communication, and since real names are recoded in management servers, there is a risk of leakage of real names, thus making it an imperfect anonymous communication system. On the other hand, in Tor, tracking is possible only when all the intermediate relay points cooperate, so that in the event of emergency, such as crime or terrorism, it has been virtually impossible to identify a communicator. In fact, an incident occurred in which a stranger's PC was taken over using Tor via a relay point in a foreign country to get away from police tracking.

Therefore, a main object of the present invention is to provide a method of allowing for anonymous participation in an anonymous communication system that ensures anonymity to the communication path and the other party of communication while enabling the identification of a communicator in the event of an emergency. In particular, what is provided is a method of participating in an anonymous communication system on the basis of the "credibility" gained by the participation in another (anonymous) communication system. The manner of creating a community through the participation in a community on the basis of the "credibility" from the participation in another community is common in the real world, thus providing a method with high affinity with the real world.

Means to Solve the Problem

In order to solve the above-described problem, the present invention provides an anonymous communication system that permits a user to communicate anonymously, allows for registration as a user of the anonymous communication system while remaining anonymous, and yet enables the identification of a communicator in the event of an emergency. This anonymous communication system comprises: a user computer operated by the user and an administrator computer operated by an administrator of the anonymous communication system; wherein the user computer includes a means to generate signed data doubly affixed with electronic signatures by a user-specific first signature key capable of being used in a communication system different from the anonymous communication system and a user-specific second signature key used in the anonymous communication system; and wherein the administrator computer includes a means to verify the electronic signatures with a first public key paired with the first signature key and a second public key paired with the second signature key and a user data registration means to register user data that includes the signed data when the validity of the electronic signatures has been verified.

In one embodiment of the present invention, the administrator computer further comprises a means to generate and provide a different second signature key for each user to the user computer. In another embodiment of the present invention, the user computer further comprises a means to generate the secret key of a user-specific public key pair as the second signature key, and the administrator computer further includes a means to issue, for the public key of the public key pair, an anonymous public key certificate that does not include identification information of the user. In another embodiment of the present invention, the user computer further comprises: a means to generate, through communication with the administrator computer, the second signature key that can be verified with the second public key; and a means to keep the second signature key secret from the administrator.

In addition, in the anonymous communication system of the present invention, the user data registered in the user data registration means of the administrator computer may include a first public key certificate that contains the first public key uniquely paired with the first signature key different for each user and information that uniquely identifies the user. One example of such a first public key certificate is a public key certificate issued by a certificate authority based on a Public Key Infrastructure (PIU), and at the time of user registration, the system administrator is capable of identifying the user based on the identification information contained on the first public key certificate (or the first public key).

Unlike the above, the first public key certificate may not include information that uniquely identifies the user, and the administrator is incapable of identifying the user based on the public key contained on the first public key certificate. In this case, for example, while the first signature key is still a signature key different for each user as in the foregoing paragraph, no information that uniquely identifies the user may be contained on the first public key certificate. The identification information contained on the public key certificate may be blank, a pseudonym of the user (provisional identification information not linked to real identification information), or the identification information of a different anonymous communication system that the user belongs to. It is not possible to obtain identification information of the user from the first public key certificate.

As another embodiment, the first signature key may be a signature key for group signatures and the first public key may be a public key for a group (another anonymous communication system). The public key certificate carries identification information of the group only, and the public key is not unique to the user but corresponds equally to the signature keys of all the users who belong to the group, making it impossible to identify and track the user based on the identification information and the public key.

User untrackability is a requirement for stronger privacy protection than anonymity that not only keeps the identify of the user secret, but even if a plurality of events are performed by the same user, it also requires the fact to be kept secret. In contrast, anonymity provided by a pseudonym, described above, does not satisfy untrackability. Indeed, it can be determined that signature events performed under the same pseudonym are results of actions of the same doer even under a pseudonym. In this case, if the identify is revealed in one event for some reason, the identify in events using the same pseudonym is revealed successively. Untrackability requires the anonymity of the same doer to be protected in other events even if the identify in one event is revealed.

In regard to group signatures, although each user belonging to the same group holds a unique signature key (a group signature key), signatures generated by these signature keys can be verified by a common group public key. Moreover, it is impossible, due to computational complexity (mathematically proven by a reasonable hypothesis about computational complexity), to distinguish which signatures are made by different users and which are made by the same user, thereby establishing untrackability in terms of computational complexity.

On the other hand, the group signature key of the user can only be generated through the cooperation of the group administrator, who controls the classified information of the group, so that if there is a legitimate reason, the group administrator can, based on a signature value, identify the group signature key used to generate the signature, that is, the user or the holder of the group signature key. Once the signer of the group signature is identified, the signer cannot repudiate the fact that he/she did the signing.

The second signature key and the second public key are configured to satisfy the requirement that the user cannot be identified based on the signature data generated by the user with the second signature key, i.e., anonymity. The above-described embodiment involving a public key certificate that carries a pseudonym and a group signature satisfies this requirement. However, in the embodiment involving a pseudonym public key certificate, as the public keys are user-specific, it is possible to track the same user by tracking the same public key even though it is not possible to identify the person. Whether anonymity alone is sufficient or untrackability is also needed is individually decided depending on the nature and the policy of the anonymous communication system.

The anonymous communication system of the present invention is characterized by comprising a means to identify a communicator in the event of emergency. Specifically, if the administrator computer further includes: a means to read out the user data from the user data registration means; a means to, if identification information capable of uniquely identifying the user is included in the read-out user data, identify the user based on that information; and a means to, if no information capable of uniquely identifying the user is included in the read-out user data, make a query about the identify of the user to an administrator of a different communication system by presenting the signed data prepared by the user.

Moreover, the present invention provides a compound anonymous communication system that comprises at least two anonymous communication systems configured as described above. The compound anonymous communication system is characterized by using the second signature key of a first anonymous communication system as the first signature key of a second anonymous communication system. This allows the user to anonymously register with the second anonymous communication system without presenting identification information during the user registration. On the other hand, in the event of emergency, a communicator is identified by the administrator of the second anonymous communication system by making a query to the administrator of the first anonymous communication system. As the first anonymous communication system is provided with a mechanism to identify the communicator in the event of emergency, the administrator of the second anonymous communication system can obtain the identification information of the communicator from the administrator of the first anonymous communication system. More particularly, the administrator computer of the second anonymous communication system comprises: a means to identify the signed data by the first signature key registered when the user subscribed to the second anonymous communication system from the user data registration means, based on the signed data generated by the second signature key of the user of the second anonymous communication system; and a means to make a query to the administrator of the first anonymous communication system about the identify of the user who has now subscribed by presenting the identified signed data.

As described above, the present invention has a plurality of anonymous communication systems combined hierarchically, and comprises a means to allow a user to perform anonymous user registration with each anonymous communication system without presenting personal identification information of the user, while also comprising a means to identify a communicator in the event of emergency by backtracking the hierarchy of the anonymous communication systems. In particular, to identify a communicator in the event of emergency, it is necessary to reach, as a result of backtracking, the communication system capable of identifying the communicator without depending on any other. For this reason, it is preferable to construct the communication system at the bottom layer of the hierarchy, based on a public key infrastructure that certainly identifies the user (e.g., ITU-T X.509).

Another requirement to identify the communicator is competency of evidence. This is a requirement called non-repudiation in the field of cryptography. Signature data generated using a signature key can be verified by a public key that uniquely corresponds to that signature key and, conversely, non-repudiation is theoretical assurance that signature data verifiable with a public key can be generated only by the corresponding signature key. All the electronic signature schemes currently put to practical use satisfy non-repudiation. In terms of legislation, the Electronic Signature Law recognizes that signature data generated by electronic signature schemes is legally competent.

Meanwhile, from the viewpoint of competency of evidence, regarding the identification of a communicator according to the present invention, the administrator of the second anonymous communication system obtains signed data by the second signature key of one user, and the administrator is provided with a means to identify the user registration data of the signer by examining that signed data. For example, in the embodiment that utilizes a pseudonym public key certificate, the administrator issues a pseudonym public key certificate as a certificate authority and at that time, links this public key certificate and thus the public key to the user registration data. In the embodiment involving group signatures, a mechanism for the administrator to identify the signer from the signed data using an administrator key is embedded in the signature scheme. According to the above-descried method, the administrator can identify the user registration data of the applicable signer from the obtained signed data. Due to non-repudiation, this identification carries competency of evidence. On the other hand, the user registration data is affixed a signature with the user's first signature key. In the "compound" configuration of the anonymous communication system of the present invention, as this first signature key is the second signature key of another anonymous communication system, by presenting the signed user registration data to the administrator of that anonymous communication system, in which the first signature key is the second signature key, the signer may be identified in a manner that provides competency of evidence. The problem is whether or not it is possible to prove, with competency of evidence, that the owner of the first signature key is the same as the owner of the second signature key. To solve this problem, the present invention specifies that the user registration data be doubly signed with the first signature key and the second signature key. That is, as the signature by the second signature key is under the effect of non-repudiation of the signature by the first signature key, the owner of the first signature key cannot repudiate the fact that the owner did the signing with the second signature key, thus not being able to repudiate his/her ownership of the second signature key.

Furthermore, the present invention provide a novel method performed by a user computer operated by a user and an administrator computer operated by an administrator of an anonymous communication system to cause the user to subscribe to the anonymous communication system, the anonymous communication system allowing the user to communicate anonymously. This method is characterized by the steps of: the user computer generating signed data doubly affixed with electronic signatures by a user-specific first signature key capable of being used in a communication system different from the anonymous communication system and a user-specific second signature key used in the anonymous communication system; providing the signed data from the user computer to the administrator computer; the administrator computer verifying the electronic signatures with a first public key paired with the first signature key and a second public key paired with the second signature key; and the administrator computer registering user data that includes the signed data when the validity of the electronic signatures is verified.

According to the foregoing method, the second signature key is generated by the administrator computer and provided to the user computer from the administrator computer. In this case, a procedure may be employed in which the administrator computer encrypts and provides the second signature key to the user computer after verifying the first signature key provided by the user computer, and the user computer generates electronically signed receipt data doubly encrypted using the first signature key and the second signature key, and transmits this to the administrator computer.

Additionally, according to the above-described method, a procedure may be employed in which the second signature key is the secret key of a user-specific public key pair and provided by the user computer to the administrator computer, and the administrator computer issues an anonymous public key certificate for the public key of the public key pair, with the anonymous public key certificate not including identification information of the user. Also, a procedure may be employed in which the user computer generates, through communication with the administrator computer, the second signature key so as to be verifiable by the second public key of the anonymous communication system, with the generated second signature key being kept secret from the administrator. Moreover, a signature key for group signatures may be used as the second signature key, and the second signature key may be generated according to a generation procedure for generating the signature key for group signatures.

Effect of the Invention

According to the system and the method of the present invention, as a user subscribes to a different anonymous communication system using a signature key that gained credibility in another communication system, a high degree of anonymity can be ensured while it is possible to identify the user as required, thereby providing the effect of enhancing the social credibility of the communication system.

DESCRIPTION OF EMBODIMENTS

Figure 1:
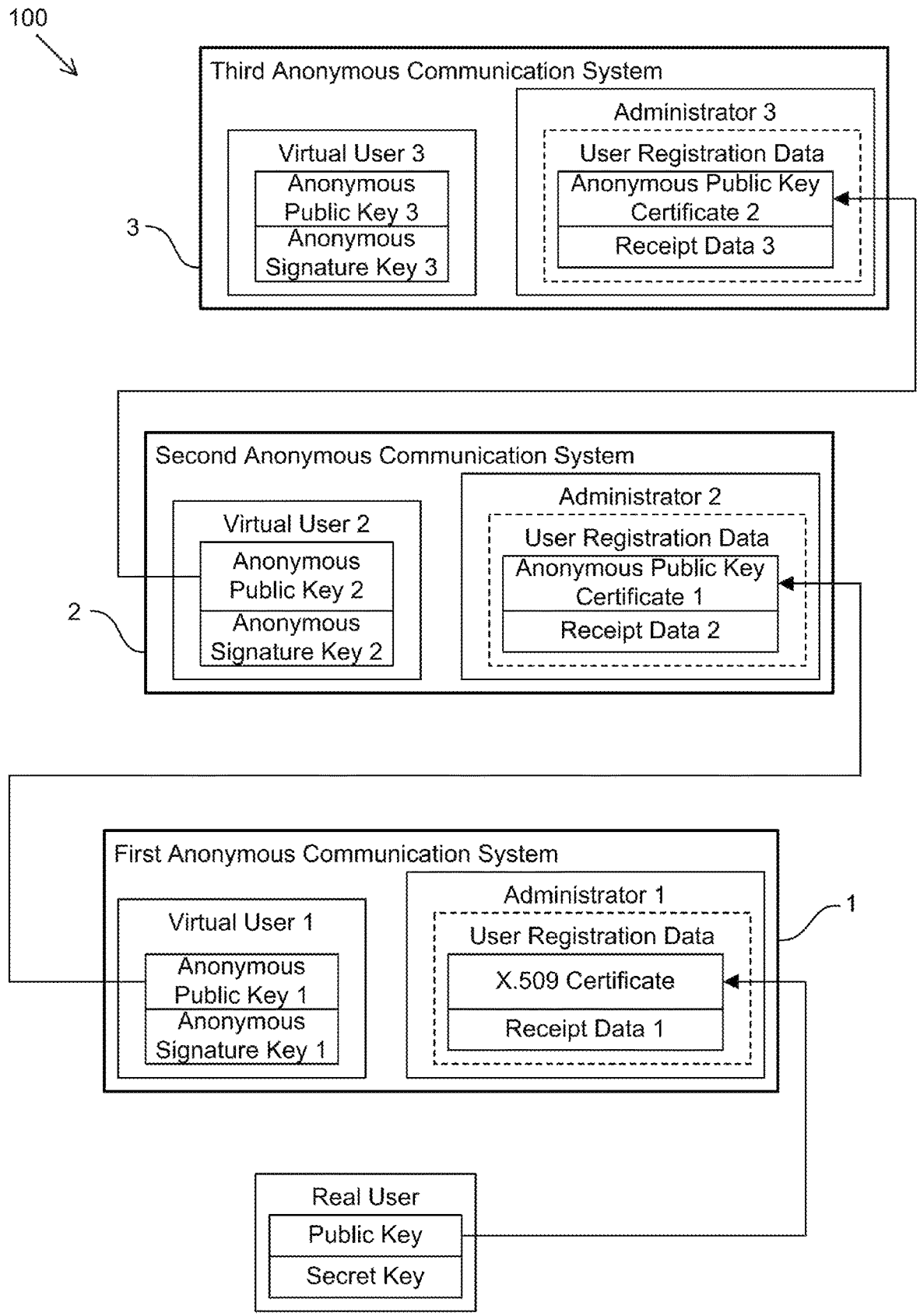
FIG. 1 is a block diagram of a compound anonymous communication system according to one embodiment of the present invention.

Embodiments of the present invention will be described hereinafter with reference to the drawings. The compound anonymous communication system 100 shown in FIG. 1 is composed of a first anonymous communication system 1, a second anonymous communication system 2, and a third anonymous communication system 3. The first anonymous communication system 1 is a system to which each user is allowed to subscribe on the condition that identification information for determining the identity of the user is provided to the system administrator. In particular, a real user holds a public key pair (a public key and a signature key) and, for the public key, the real user has a public key certificate compliant with ITU-T X.509 issued by a certificate authority. The issuance of an X.509 public key certificate involves the confirmation of the identity of the user by the certificate authority, and the X.509 certificate contains identification information that uniquely identifies the user. If the real user is to be registered in the first anonymous communication system 1 and create an account of a virtual user 1 in the first anonymous communication system 1, the real user is required to register this X.509 public key certificate. This allows the administrator of the first anonymous communication system 1 to know the identification information of the virtual user 1.

An anonymous public key 1 and an anonymous signature key 1 are held in the account of the registered virtual user 1. The anonymous public key 1 is specified in an anonymous public key certificate 1 (not shown) issued by the administrator 1. The anonymous public key 1 and the anonymous public key certificate 1 are configured not to identify the user. For example, while the anonymous public key 1 and the anonymous public key 1 constitute a public key pair in an ordinary public key cryptography, the anonymous public key certificate 1 is a public key certificate issued by the administrator 1 without containing the identification information of that user. Although the public key pair itself is user-specific, the virtual user 1 may sign anonymously as the signer cannot be determined based on the anonymous public key certificate 1. On the other hand, as the anonymous public key certificate 1 is signed by the administrator of the anonymous communication system 1, a recipient of data signed with the anonymous signature key 1 can verify that it is data signed by a user who is legitimately registered with the first anonymous communication system 1. In addition, with the first anonymous communication system 1 declaring a policy of "confirming the identity of a user based on an X.509 public key certificate at the time of registration," the aforementioned recipient may be aware that the signer is a user who is properly identified by the first anonymous communication system 1 even though it is not possible for the recipient to know the identify of the signer. As another example, the anonymous public key 1 may be a public key for group signatures and the anonymous signature key 1 may be a signature key for group signatures. In this case, the anonymous public key 1 serves as the common key for all the users of the first anonymous communication system 1 and the anonymous public key certificate 1 serves as the public key certificate for the group, which is the first anonymous communication system 1 in this case, without providing information that identifies the user. Due to the function of a group signature, while the anonymous public key 1 is a different key specific to each user, the signatures generated by the anonymous public keys 1 can be verified by the common group public key, i.e., the anonymous public key 1.

In contrast, each of the second and third anonymous communication systems 2 and 3 is a system with which users are allowed to register without providing to the system administrator identification information for determining their identity. In fact, when registering a virtual user 2 with the second anonymous communication system 2 and creating an account, the virtual user 1 is required to submit the anonymous public key certificate 1 to the administrator 2. As described above, as the anonymous public key certificate 1 has affixed thereto a signature of the administrator 1 of the first anonymous communication system, the administrator 2 can confirm that the virtual user 1 is a legitimate user of the first anonymous communication system 1 (to be exact, confirmation is made by verifying the signature of a receipt data 2, which will be described in detail below) but cannot identify the virtual user 2 and thus not the real user, either. That is because the anonymous public key certificate 1 does not contain information that identifies the user. The same applies when the virtual user 2 registers a virtual user 3 with the third anonymous communication system 3 and creates an account. The anonymous public key certificate 2, held as part of the user registration data in the third anonymous communication system 3, does not identify the virtual user 2 and thus not identify the virtual user 1 or the actual user, either.

However, the compound anonymous communication system 100 of the present invention is not limited to the simple hierarchical structure shown in the example of FIG. 1; rather, it may assume a free network structure among any number of anonymous communication systems. For example, in order to register the virtual user 3 with the third anonymous communication system 3, an account with the first anonymous communication system 1 may be used, that is, the anonymous public key certificate 1 may be registered, or an account may be created by registering the X.509 public key certificate, which identifies the real user. It should be the policy of an anonymous communication system to determine from which anonymous communication system an anonymous public key certificate may be accepted or whether or not to permit mixed registration both with an anonymous public key certificate and by X.509 public key certificates.

Figure 4:
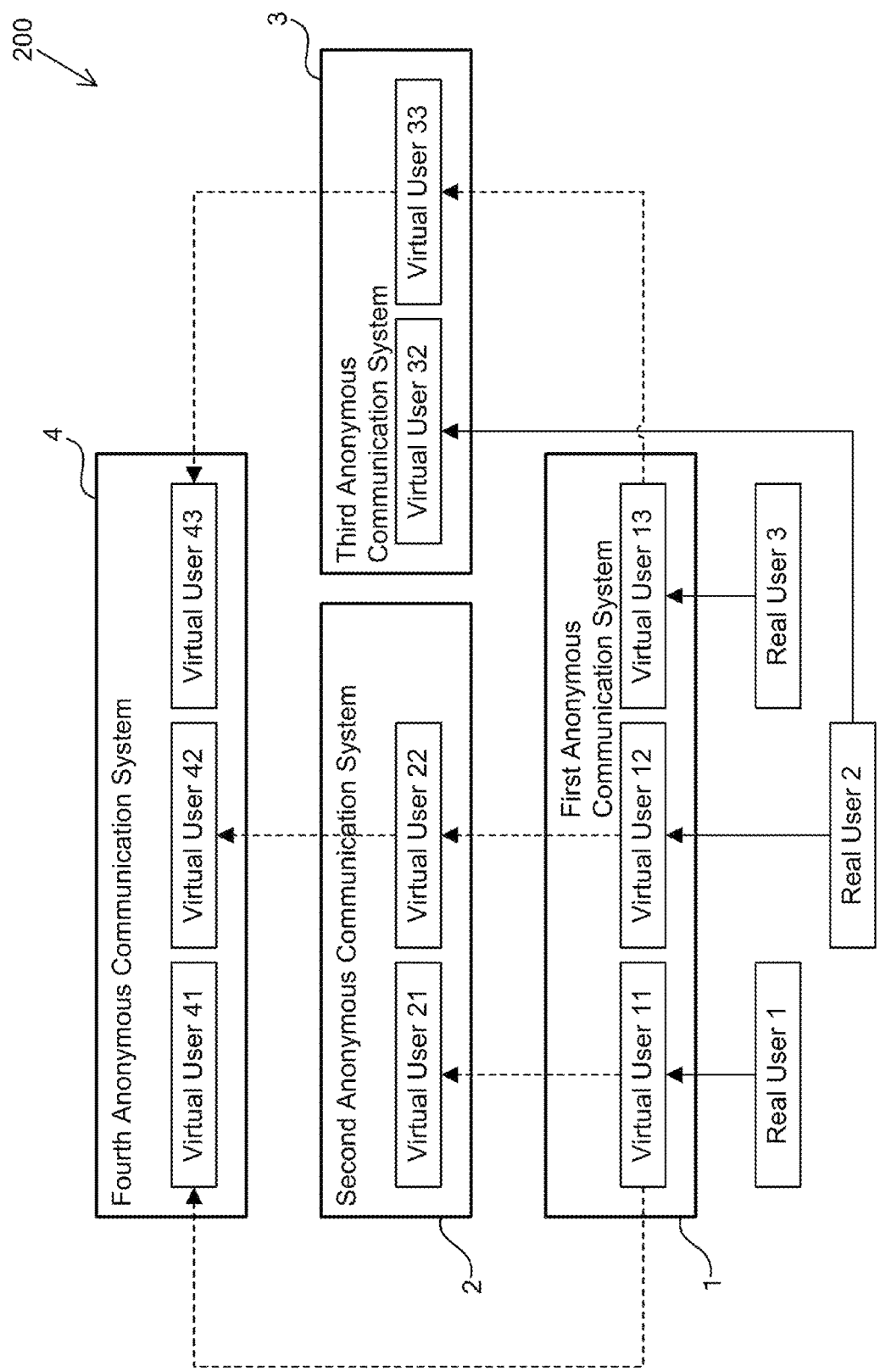
FIG. 4 is a block diagram showing a modification of a compound anonymous communication system according to the present invention.

FIG. 4 shows an exemplary configuration of a freer compound anonymous communication system 200. The first anonymous communication system 1 has a policy of "verifying the identify of real users and registering the X.509 public key certificates that contain the identity of the real users" when performing user registration. In the figure, the arrows indicate based on which users new users are created wherein the arrows in solid lines indicate user registration by real users that involves identification and arrows in broken lines indicate user registration anonymously made based on virtual users. Indeed, virtual users 11, 12, and 13 are virtual users created by real users 1, 2, and 3, respectively, upon establishing their identity to the administrator 1. Meanwhile, the second anonymous communication system 2 has the policy of "accepting registration of virtual users that involves identification of real users only." As the virtual users 11 and 12 meet this condition, virtual users 21 and 22 are created based on the virtual users 11 and 12. In this case, the public key certificates registered with the second anonymous communication system 2 are the anonymous public key certificates for verifying anonymous signatures of the virtual users 11 and 12 and, as described above, the users cannot be identified from the anonymous public key certificates. Likewise, the third anonymous communication system 3 has the policy of "accepting both anonymous registration based on virtual users and registration that involves identification based on real users," and the fourth anonymous communication system 4 has the policy of "accepting anonymous registration based on any virtual users."

Figure 2:
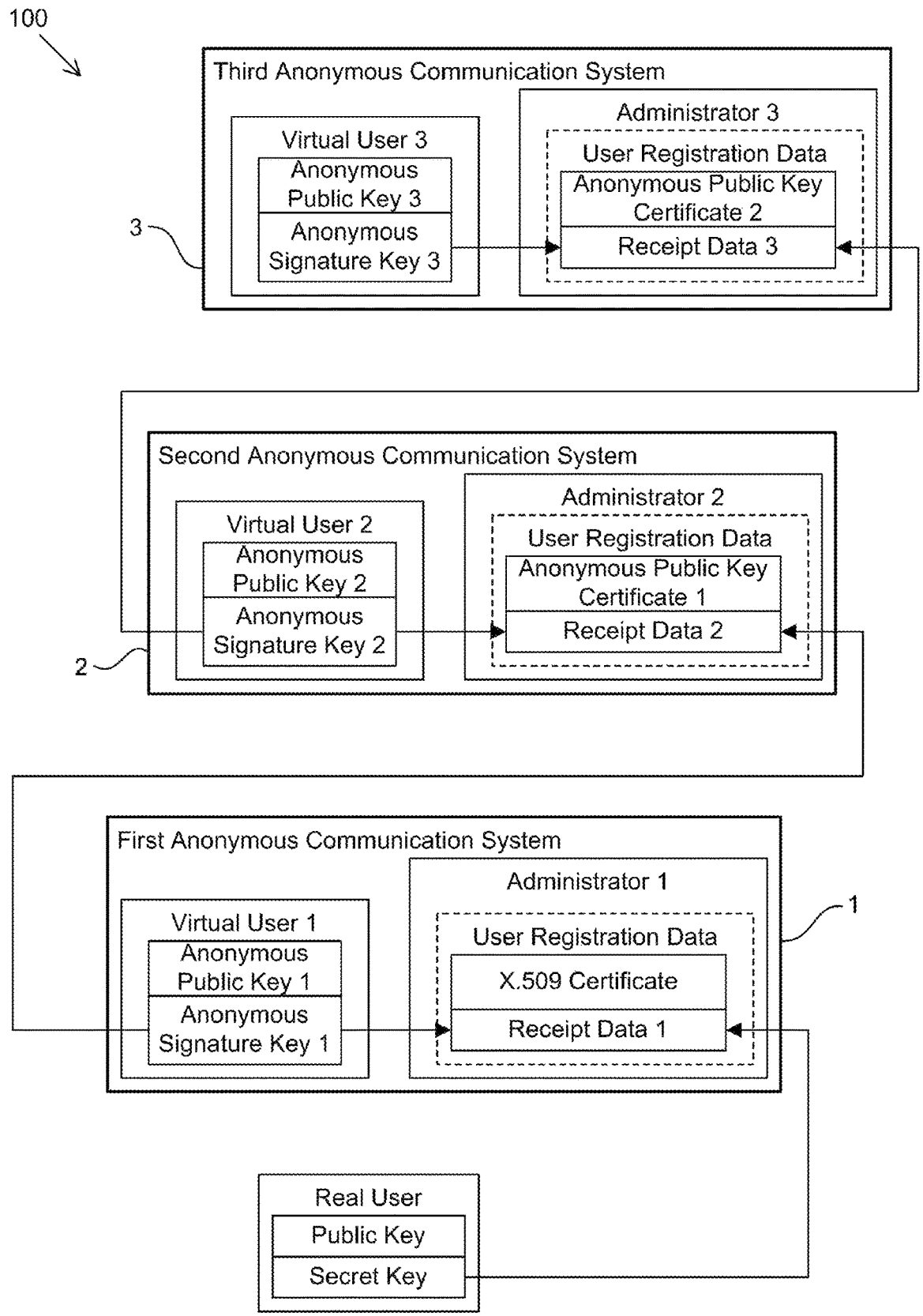
FIG. 2 is a block diagram showing the procedure for registering a user with the anonymous communication system of FIG. 1.

FIG. 2 is provided for describing user registration in further detail based on FIG. 1. In user registration, in addition to a public key certificate of a virtual user or a real user, a receipt data signed by that user is also registered. For example, the receipt data 1 is data that is doubly signed with the signature key of the registered real user and the anonymous signature key 1 of the virtual user 1 created by the registration. In the figure, the arrows show that the data indicated by the end point of each arrow is signed with the signature key indicated by the start point of the arrow. The anonymous signature key 1 may conceivably be created, for example, by a method whereby the administrator creates and sends it to the real user, a method whereby the user creates it by himself/herself, or a method whereby the user and the administrator create it through communication, etc., depending on the anonymous signature scheme of each anonymous communication system, for example, their respective algorithm for group signatures. If the user is involved in the creation of an anonymous signature key, the purpose is to maintain the confidentiality of the signature key from the administrator, thus providing strict non-repudiation. The purpose of doubly signing a single piece of receipt data with two keys is to associate two users, that is, the real user, on which the registration is based, and the virtual user 1, who was created as a result of the registration. The significance of this will be described later. Likewise, to create the virtual user 2 based on the virtual user 1, the virtual user 1 doubly signs the receipt data 2 with the anonymous signature key 1 and the anonymous signature key 2. The signed receipt data 2 provides a proof that the virtual user 2 is in fact the virtual user 1.

Figure 3:
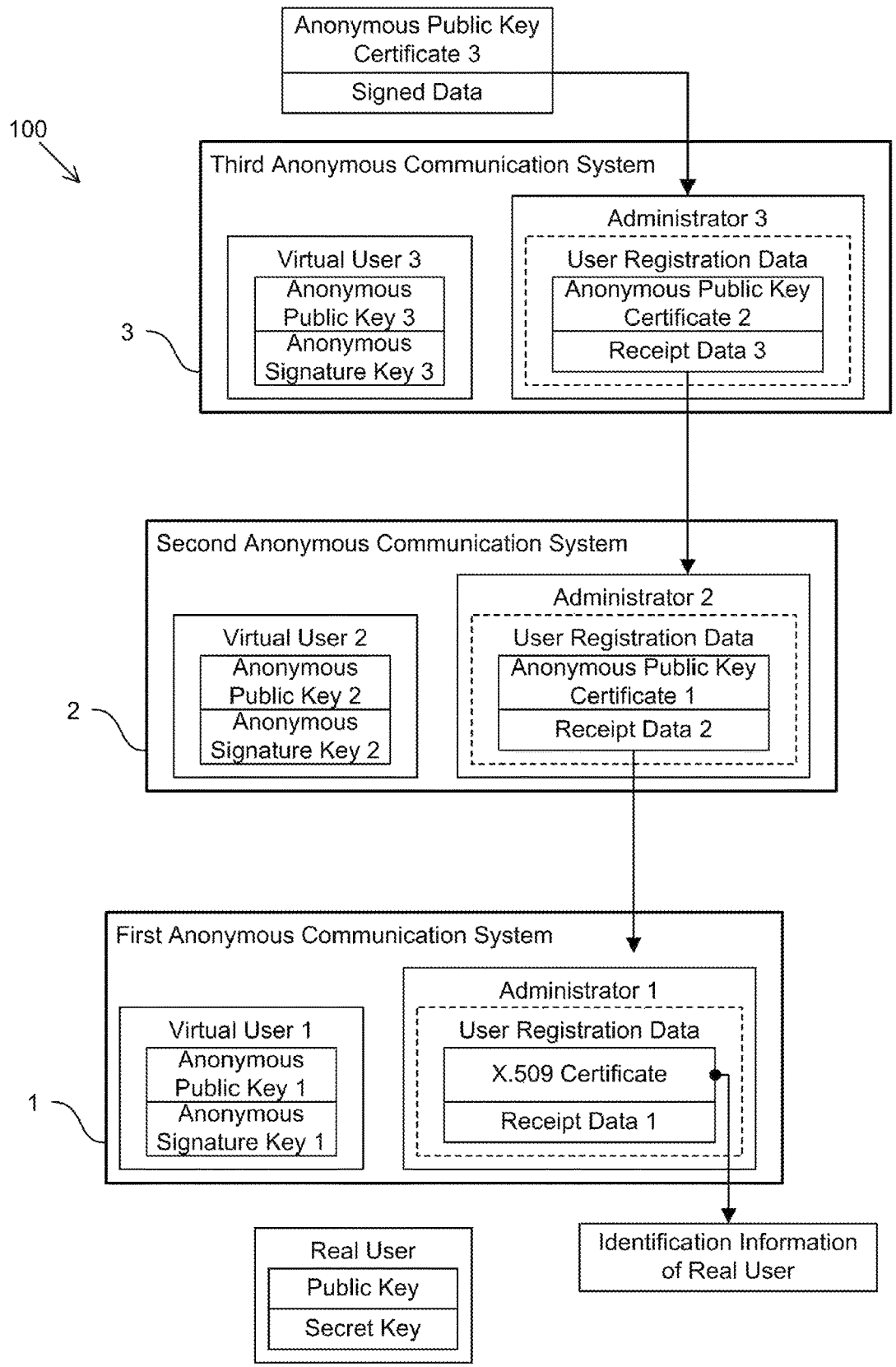
FIG. 3 is a block diagram showing the procedure for identifying a user in the anonymous communication system of FIG. 1.

FIG. 3 shows the procedure for determining the identity of a user in the event of an emergency, such as a dispute between users or a request from investigating authorities. The administrator 3 of the third anonymous communication system 3 receives data signed with the anonymous signature key 3 and an anonymous public key certificate 3 containing the anonymous public key 3 for verifying that signature along with a request for disclosure of the identify of the user. The administrator 3 first confirms that the signature is correctly verified with the anonymous public key 3 and then examines the reason for the request for disclosure. If the request for disclosure is appropriate according to the policy of the anonymous communication system, the user registration data of the virtual user 3, i.e., the signer, may be identified based on the anonymous public key certificate 3 and the signed data. This is performed, for example, as blow. If the anonymous public key 3 is data specific to the virtual user 3, that is, if the virtual user 2 independently created the anonymous signature key 3 and the anonymous public key 3 and if the administrator 3 created an anonymous public key certificate 3 of the anonymous public key 3 which does not include identification information of the virtual user 2, the user registration data can be identified using the anonymous public key 3 specific to the user as the search key. Additionally, if the anonymous public key 3 is a public key for group signatures, the anonymous public key 3 is common to the group and the anonymous public key certificate 3 is also common to the group. However, due to the function of a group signature, the administrator 3 can identify the virtual user 3, i.e., the signer, by using an administrator key, which is the administrator's secret. Here, depending on the group signature system, the anonymous signature key 3 itself may be identified, or an identifier of the virtual user 3 may also be identified. In any case, the user registration data can be identified based on the obtained information.

The above-described identified user registration data includes the anonymous public key certificate 2 and the receipt data 3. As the receipt data 3 has been signed by the virtual user 2 with the anonymous signature key 2, when the administrator 3 sends the administrator 2 the anonymous public key certificate 2 and the receipt data 3 with a request for disclosure of the identity of the user, the administrator 2 can identify the user registration data of the virtual user 2 in the same manner as described above. Furthermore, the administrator 2 sends the administrator 1 the anonymous public key certificate 1 and the receipt data 2 in the identified user registration date along with a request for disclosure. The administrator 1 identifies the user registration data of the virtual user 1 in the same manner as described above.

As the X.509 public key certificate of the real user is registered on the user registration data of the virtual user 1 and identification information of the real user is contained on that public key certificate, it is possible to identify the real user.

The administrator 1 replies to the administrator 2, i.e., the originator of the request for disclosure, with identification information of the identified real user, and the administrator 2 replies to the administrator 3, i.e., the originator of the request for disclosure, with the identification information of the obtained real user. Lastly, the administrator 3 replies to the originator of the original request for disclosure with the identification information of the obtained real user. In this way, the originator of the request for disclosure can identify the real user who signed based on the data signed with the anonymous signature key 3.

Non-repudiation is explained with reference to FIG. 3. Non-repudiation is the assurance that a signer is unable to deny that the signer did the signing and it is one of the basic requirements of digital signatures. That is, if a signature is verified using a public key, it indicates the property that can mathematically prove that that signature was generated with a particular signature key linked to that public key (to be precise, it is possible to prove that the probability that it was generated without using that signature key is astronomically small). That is, due to non-repudiation, it is possible to prove that the owner of the signature did the signing. To be exact, it is a common practice for a certificate authority to generate and issue a signature key to a user, in which case, those who have the knowledge of the signature key are two parties, the certificate authority and the user; as the certificate authority is considered a trusted third party, the user cannot repudiate the fact that the user did the signing.

Non-repudiation, as required in FIG. 3, means that, regarding the data signed with the anonymous signature key 3 submitted to the administrator 3, the real user, who is the actual entity of the virtual user 3, cannot repudiate the fact that the real user did the signing. This fact can be recursively proved as below. First, the receipt data 1 is affixed with a signature that can be verified with the public key contained on the X.509 public key certificate. Therefore, the real user cannot repudiate the fact that the real user signed the receipt data. Meanwhile, as the receipt data is affixed with a signature with the anonymous signature key 1, the real user cannot repudiate the fact that the real user signed the receipt data with the anonymous signature key 1, that is, the real user cannot repudiate the fact that the real user owns the anonymous signature key 1. Next, as the receipt data 2 is affixed with a signature with the anonymous signature key 1, the real user cannot repudiate the fact that the real user signed the receipt data 2 with the anonymous signature key 1 due to non-repudiation, and as the receipt data 2 is affixed with a signature with the anonymous signature key 2, the real user cannot repudiate the fact that the real user owns the anonymous signature key 2 for the same reason as given above. Furthermore, by applying the same argument to the receipt data 3, the real user cannot repudiate the fact that the real user owns the anonymous signature key 3. Lastly, as the signed data that was presented to the administrator 3 together with the request for disclosure was signed with the anonymous signature key 3, the real user cannot repudiate the fact that the real user signed that signed data.

Figure 5:
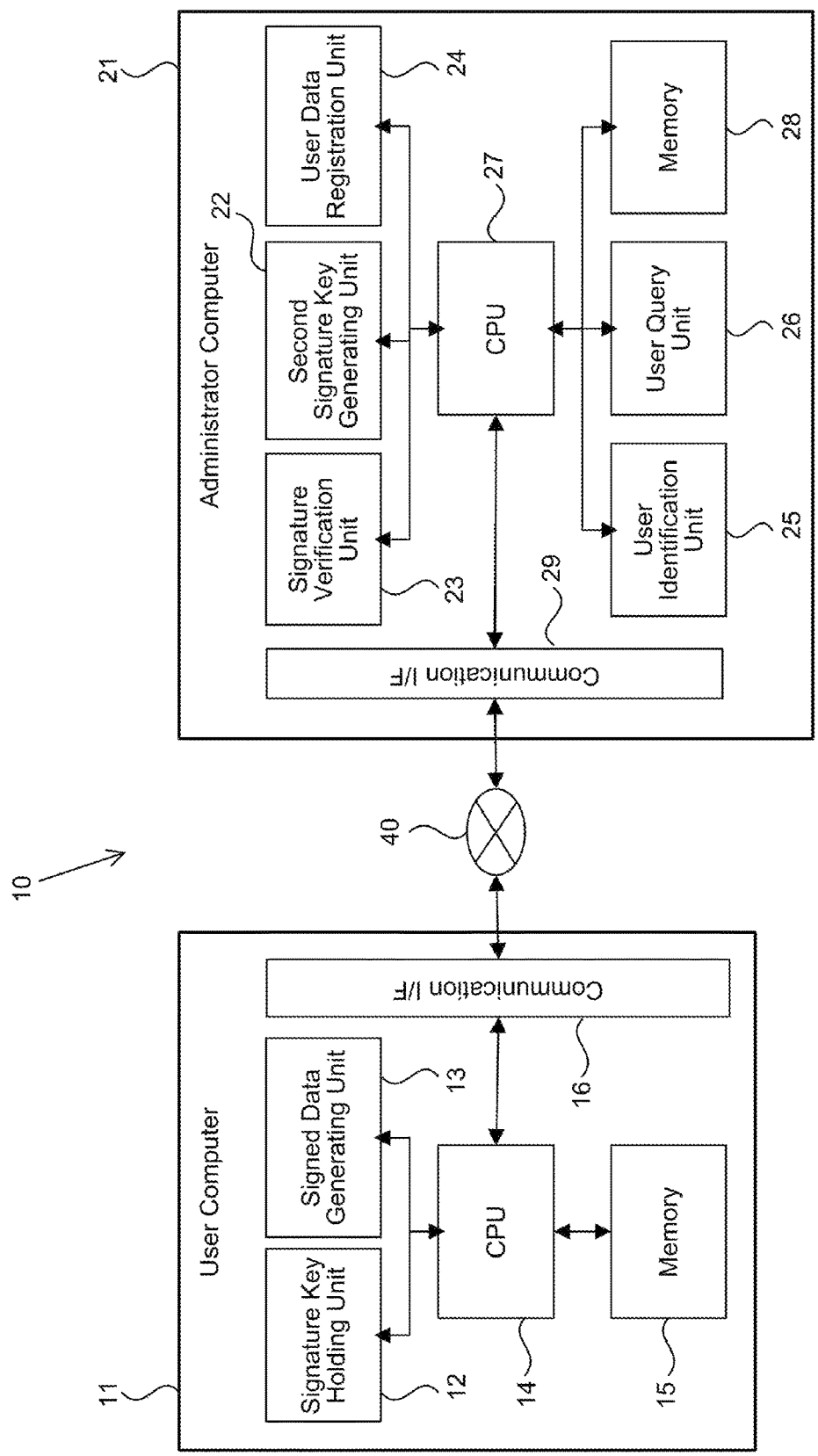
FIG. 5 is a block diagram showing the configuration of the user and administrator computers of the anonymous communication system.
Figure 6:
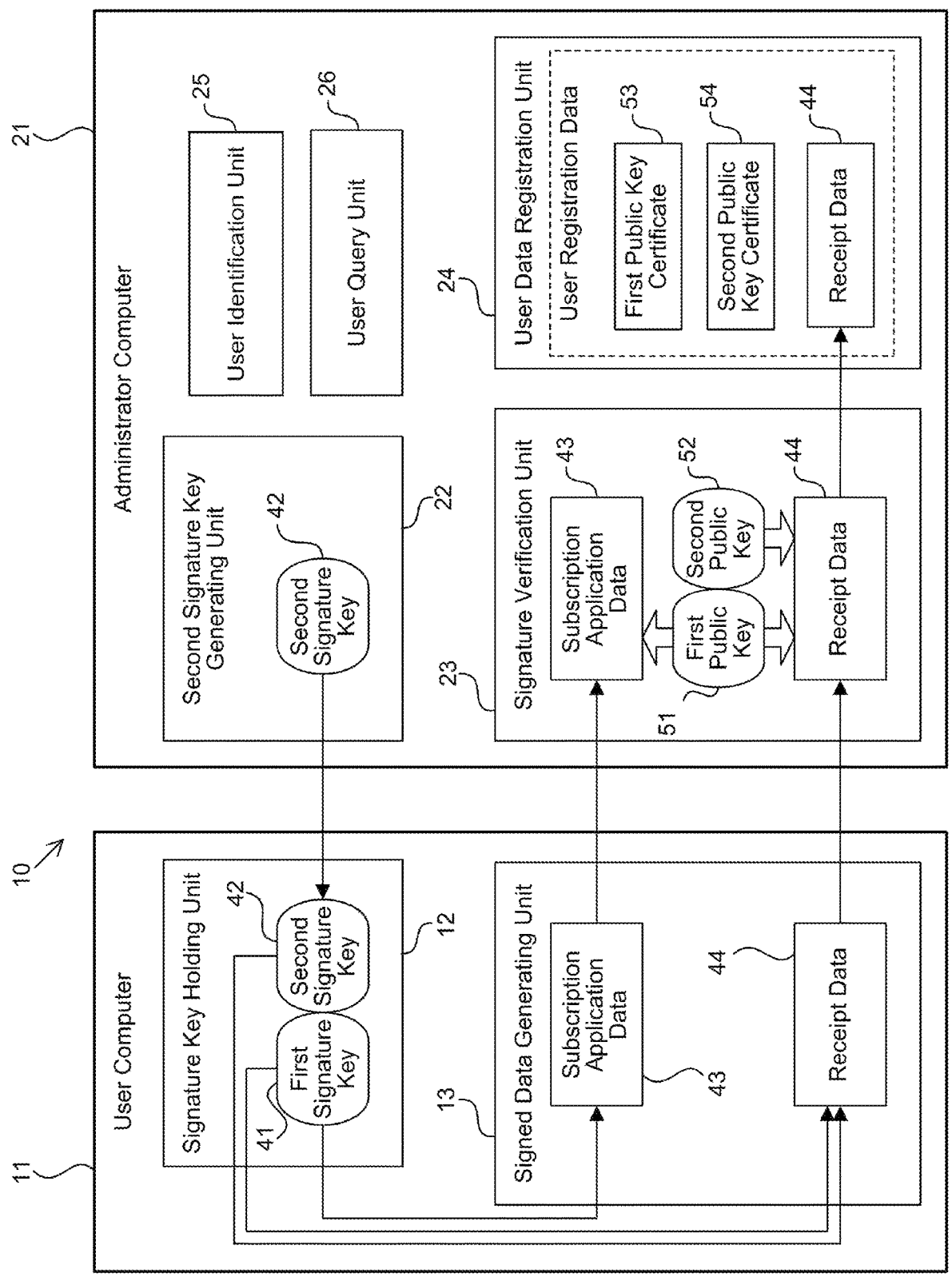
FIG. 6 is a block diagram showing the transfer of data between the computers during user registration.

FIG. 5 shows the configuration of one anonymous communication system 10 included in the above-described compound anonymous communication system 100 or 200, and FIG. 6 shows the transfer of data in that anonymous communication system 10. The anonymous communication system 10 shown in FIG. 5 and FIG. 6 is provided with a user computer 11 operated by a user who subscribes to that anonymous communication system 10 and an administrator computer 21 operated by the administrators of the anonymous communication systems 1 and 2. Additionally, the user computer 11 and the administrator computer 21 are connected via the Internet 40 or some other communication lines.

The user computer 11 is provided with a signature key holding unit 12, a signed data generating unit 13, a CPU 14, a memory 15, and a communication interface 16. The signature key holding unit 12 holds a user-specific first signature key 41 capable of being used in another anonymous communication system that is different from this anonymous communication system 10 and a user-specific second signature key 42 that has been given by the administrator computer 21 for use in this anonymous communication system 10. The signed data generating unit 13 generates subscription application data 43 affixed with an electric signature electronically signed with the first signature key 41 and also generates receipt data 44 (corresponding to receipt data 1, 2, and 3 shown in FIG. 1) that is electronically signed data doubly signed with the first signature key 41 and the second signature key 42.

The administrator computer 21 is provided with a second signature key generating unit 22, a signature verification unit 23, a user data registration unit 24, a user identification unit 25, a user query unit 26, a CPU 27, a memory 28, and a communication interface 29. The second signature key generating unit 22 serves as a means to generate a different second signature key 42 for each user and provide it to the user computer 11 via the communication interface 29. The signature verification unit 23 verifies the electric signature of the subscription application data 43 with a first public key 51 which is paired with the first signature key 41, and verifies the electric signature of the receipt data 44 with the first public key 51 and also a second public key 52 which is paired with the second signature key 42.

Then, when subscribing to the anonymous communication systems 1 and 2, the user computer 11 provides the administrator computer 21 with the subscription application data 43; after verifying the electronic signature of the subscription application data 43, the administrator computer 21 generates and provides a second signature key 42 for the user computer 11; upon receiving the second signature key 42, the user computer 11 provides the receipt data 44 affixed with double signatures for the administrator computer 21; the administrator computer 21 verifies the electronic signatures of the receipt data 44; and when the validity of the electronic signatures is verified, user data including the receipt data 44 is registered in the user data registration unit 24.

The user data registered in the user data registration unit 24 includes, in addition to the receipt data 44, a first public key certificate 53 containing the first public key 51, which is paired with the first signature key 41, and a second public key certificate 54 containing the second public key 52, which is paired with the second signature key 42. For example, if user registration with the first anonymous communication system 1 shown in FIG. 1 requires confirmation of the identity of the user, the first public key certificate 53 is, for example, a public key certificate compliant with ITU-T X.509 containing a user-specific public key and identification information. In this case, the system administrator may uniquely identify the user from the user data as required. For example, if the second anonymous communication system 2 shown in FIG. 1 does not require confirmation of the identity of the user, no identification information is contained on the first public key certificate 53. In this case, the first public key certificate 53 may be an anonymous public key certificate that contains a pseudonym of the user only, or it may also be a public key certificate that contains a group public key for group signatures and identification information for the group.

On the other hand, as the second anonymous communication system 2 provides the user with anonymous communication, the second public key certificate 54 does not contain identification information of the user; for example, it may be anonymous public key certificate containing a pseudonym of the user only or a public key certificate containing a group public key for group signatures and identification information of the group. In the former case, as the second signature key 42 is a signature key different for each user and the second public key 52, which is paired with the second signature key 42, is also different for each user; however, as the second public key certificate 54 contains a pseudonym only without identifying the user, the other party of communication cannot identify the signer even if it is possible to verify a signature with the second signature key 42 using the second public key 52 contained on the second public key certificate 54. In the latter case, as the second signature key 42 is a signature key for group signatures, the other party of communication can verify a signature with the second signature key 42 using the second public key 52 contained on the second public key certificate 54. The second public key 52 is common to all the members belonging to the group (in this case, all the users registered with the second anonymous communication system 2), it is, in principle, impossible to identify the signer by verification. However, in the former case, in which a pseudonym public key certificate is used, a signature is verified with the second public key 52, which is different for each user; so that when two signatures are provided, it is possible to determine whether or not they are signed with the same second public key. On the other hand, in the latter case with a group signature, as all the signatures are verified with the same second public key 42, it is not even possible to identify the second signature key. In other words, the latter satisfies a higher level of anonymity in that it satisfies untrackability.

The administrator can perform a task of identifying the signer on the registration information based on the signing of the content of the communication with the second signature key 42. One conceivable example of requiring this task is a dispute between communicators. As an example, when an Internet sales site enters into contract with a customer via communication, the customer signs a letter of consent to make payment and sends it to the sales site; at this time, if the customer wishes to keep his/her identity secret from the sales site from the viewpoint of privacy, the customer signs with his/her own second signature key 42. While being able to confirm the intent of payment by verifying the signature with the public key 52, the sales site cannot identify the customer. Later on, should the customer fails to make the payment, the sales site will have to identify the customer and take measures, such as urging the customer; at this time, the sales site provides the administrator with the signature by the second signature key 42 sent by the customer and the second public key certificate 54 used for signature verification. On the other hand, the administrator identifies the user registration data registered in the user data registration unit 24 based on the signature and the second public key certificate 54. For example, if the second public key certificate 54 is the above-described pseudonym certificate, as the public key contained on the second public key certificate 54 is user-specific, the user registration data can be identified using that public key as the search key. Also, if the public key contained on the second public key certificate 54 is a public key for group signatures, it is possible to utilize the mechanism of the group signature to identify the second signature key 42 based on the signature value, thereby being able to identify the user registration data.

If a first public key certificate 53 containing an identifier of the user is included in the user registration data, for example, if the first public key certificate 53 is a public key certificate compliant with ITU-T X.509, it is possible to identify the user based on the identification information contained on that certificate. On the other hand, if the first public key certificate 53 does not contain identification information of the user, by sending the first public key certificate 53 and the signed receipt data 44 of the user registration data to the administrator of the anonymous communication system 10, the administrator of the anonymous communication system 10 is allowed to identify the user. For example, if the first public key certificate 53 is the above-described pseudonym public key certificate, as the public key contained on the first public key certificate 53 is user-specific, the administrator of the anonymous communication system 10 can identify the user registration data of the anonymous communication system 10 using that public key as the search key. If the first public key certificate 53 is a public key for group signatures, it is possible to utilize the mechanism of the group signature to determine the first signature key based on the signature on the receipt data 44, thereby being able to identify the user registration data in the anonymous communication system 10.

As described above, the identification information of a user is determined due to a recursive query. If unable to obtain the identification information of the user from the public key certificate 53, the administrator of an anonymous communication system makes a query to the administrator of a different anonymous communication system. If the administrator of the different anonymous communication system is unable to obtain the queried identification information of the user from the public key certificate 53 in the user registration data of his/her own anonymous communication system, the administrator makes a query to the administrator of a still different anonymous communication system. In such a recursive query, there needs to be a guarantee that identification information of the user can be eventually obtained; since user registration must be made based on a first public key certificate that contains user identification information during the user registration, for example, the public key certificate in compliant with ITU-T X.509 in the anonymous communication system created first in chronological order (the first anonymous communication system 1 shown in FIG. 1 and FIG. 4), a reply is eventually made to the recursive query in the hierarchically structured group of anonymous communication systems (the compound anonymous communication system).

Figure 7:
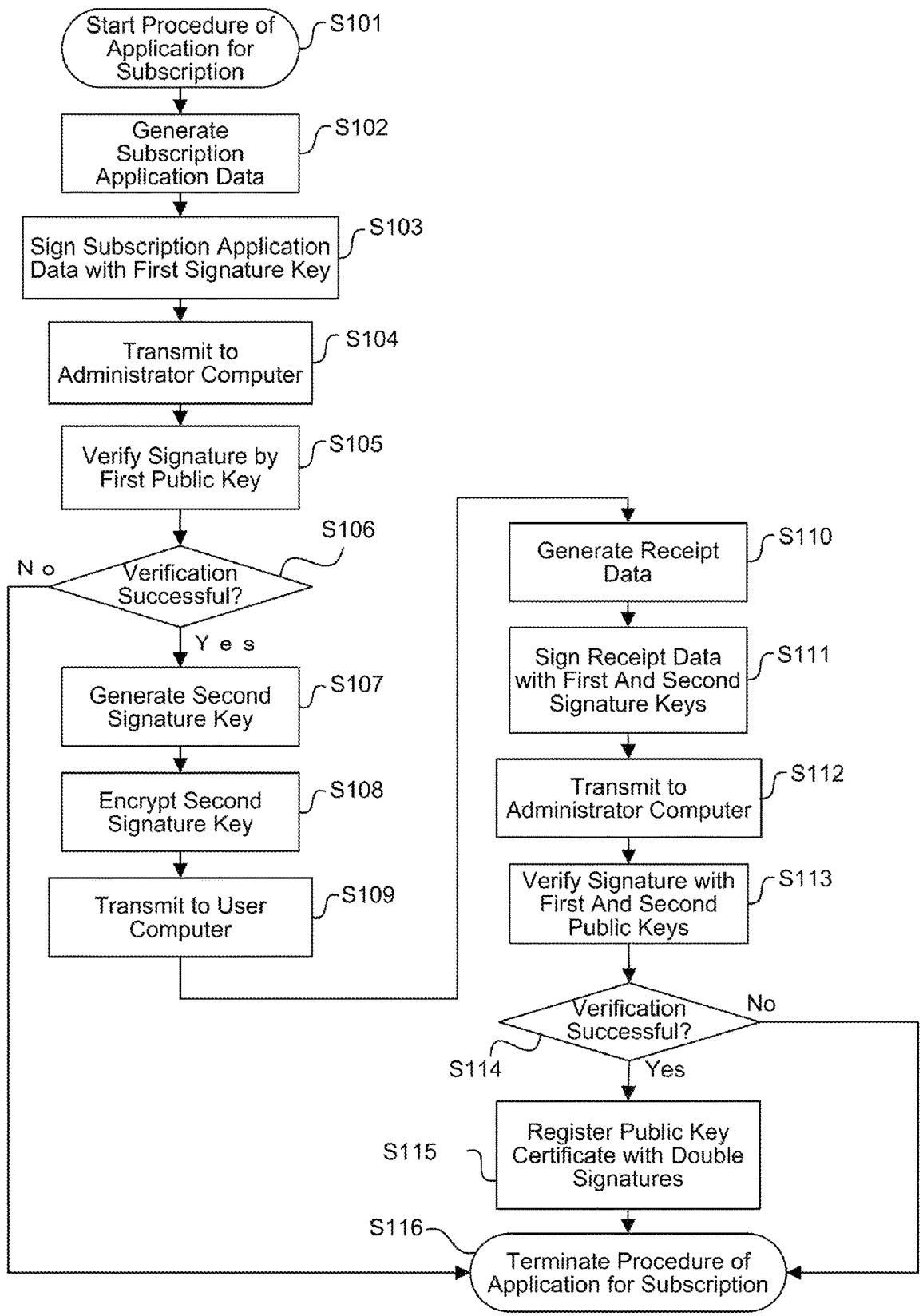
FIG. 7 is a block diagram showing the procedure for subscribing to the anonymous communication system.

Next, a method in which a user subscribes to the anonymous communication system 10 will now be described with reference mainly to FIG. 7. FIG. 7 is a flowchart showing the procedure of application for subscription performed by the user computer 11 and the administrator computer 21 when a user subscribes to the anonymous communication system 10. First, once the user makes an application for subscription (e.g., clicks on an subscription application button or link on a web screen, etc.), the procedure of application for subscription starts (S101), in which the user computer 11 generates subscription application data 43 (S102), electronically signs the subscription application data 43 with the first signature key 41 (S103), and transmits it to the administrator computer 21 (S104).

Upon receiving the subscription application data 43 from the user computer 11, the administrator computer 21 verifies the electronic signature of the subscription application data 43 with the first public key 51 (S105). Then, if the validity of the electronic signature cannot be verified (No in S106), subscription is denied to terminate the procedure of application for subscription (S116). If the validity of the electronic signature is verified (Yes in S106), the administrator computer 21 generates a second signature key 42 in the second signature key generating unit 22 (S107) and encrypts this in such a way as to allow only the user computer 11 to decode it (S108), and transmits it to the user computer 11 (S109).

Upon receiving the second signature key 42 from the administrator computer 21, the user computer 11 generates a receipt data 44 (S110), doubly electrically signs the receipt data 44 with the first signature key 41 and the decoded second signature key 42 (S111), and transmits this signed data to the administrator computer 21 (S112).

Upon receiving the receipt data 44 from the user computer 11, the administrator computer 21 verifies the double electronic signatures of the receipt data 44 with the first and second public keys 51 and 52 (S113). Then, if the validity of even one of the double electronic signatures cannot be verified (No in S114), subscription is denied to terminate the procedure of application for subscription (S116). If the validity of the double electronic signatures are fully verified (Yes in S114), the doubly signed receipt data 44, the first public key certificate, and the second public key certificate are registered in the user data registration unit 24 (S115), and then the procedure of application for subscription is terminated (S116).

Therefore, according to this anonymous communication system 10, the user can subscribe to a new anonymous communication system without revealing his/her identify by using the signature key that has been used in a different communication system as the first signature key 41 and presenting the system administrator with subscription application data 43 and receipt data 44 signed with that signature key; therefore, it is possible to exchange various data with a wide range of users in a community where a high degree of anonymity is guaranteed without revealing more of his/her own privacy than is necessary. In particular, as the anonymous communication system 10 of this embodiment is configured to cause the administrator computer 21 to provide the user computer 11 with the second signature key 42 on the condition that the electronic signature of the subscription application data 43 is verified, malicious entrants can be excluded in advance so as to enhance the safety and reliability of the system.

Figure 8:
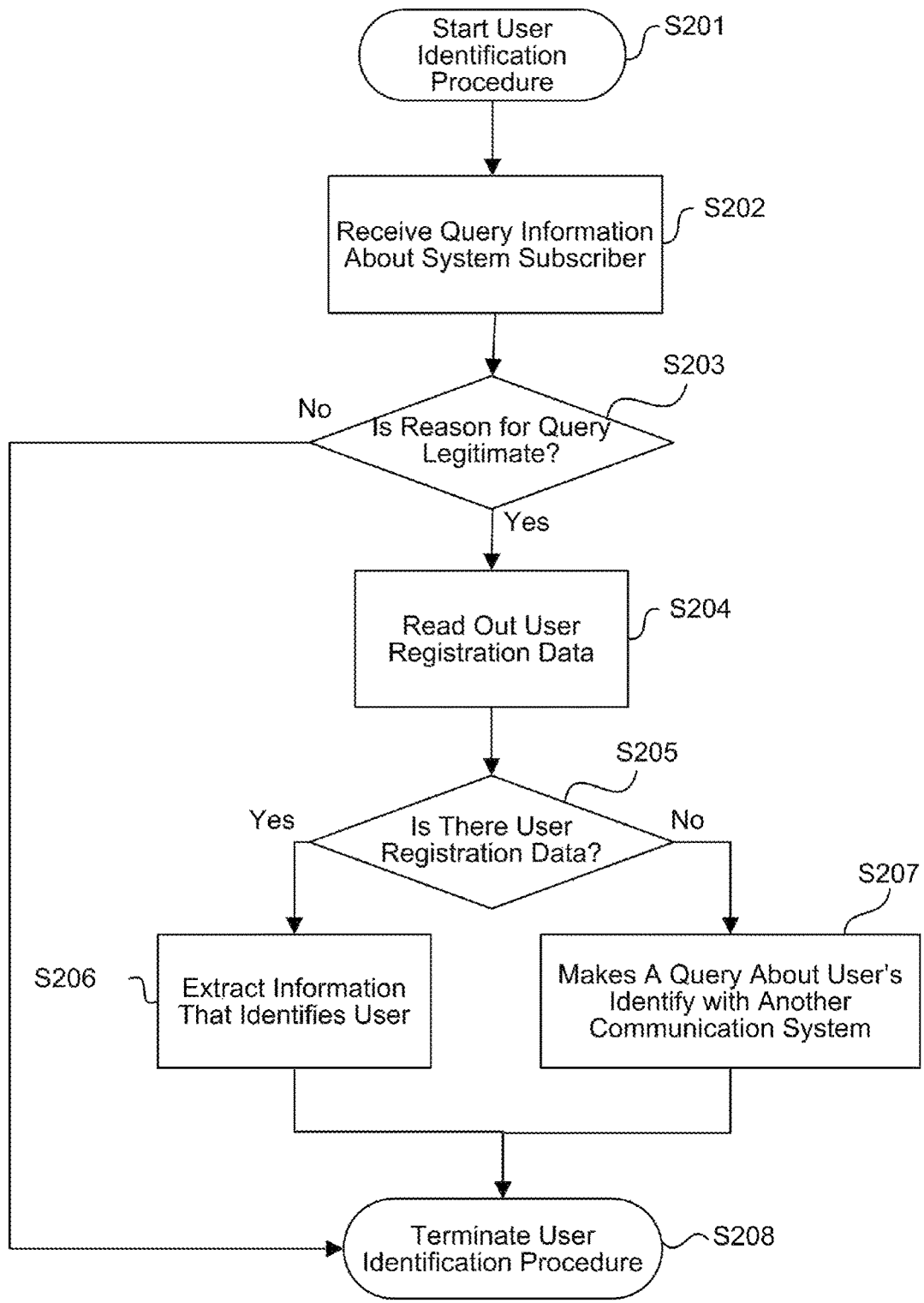
FIG. 8 is a block diagram showing the procedure for identifying a user in the event of an emergency.

Moreover, the administrator computer 21 not only verifies the first signature key 41 in the subscription application data 43 as a proof of the credibility of the user, but also uses the first signature key 41 in the subscription application data 43 as information to identify the user as required so that the safety and social credibility of the system can be further enhanced without sacrificing the anonymity of the user. FIG. 8 illustrates the procedure in which the administrator computer 21 uses the receipt data 44 to identify a user.

In the flowchart shown in FIG. 8, once a user identification procedure is started (S201), the administrator computer 21 first receives query information about a system subscriber from inside/outside the anonymous communication system 10 (S202). Next, the data signed with the second signature key 42 and the second public key certificate 54 included in the query information are obtained. If the second public key certificate 54 is common in that anonymous communication system, it is not necessary to include the second public key certificate 54 in the query information. Furthermore, the second signature key 42 contained on the second public key certificate 54 is used to verify the signature of the aforementioned signed data, and if the verification has failed, the query is determined to be improper to terminate the user identification procedure. If the signature is successfully verified, then the reason for the query is carefully examined to determine whether or not the reason is a legitimate one (S203). If the reason for the query is not legitimate, the user identification procedure is terminated to protect the personal information of the queried user (system subscriber) (S208). If the reason for the query is legitimate, the user registration data of the queried user is read out from the user data registration unit 24 (S204). In this case, the method of identifying the user registration data varies depending on the manner of composing the second signature key 42 and the second public key 52. For example, if the second public key certificate 54 is a pseudonym public key certificate that contains a user-specific public key, the user registration data can be identified using the second public key certificate 54 as the key for search. Alternatively, if the second public key certificate 54 is a public key certificate that contains a public key for group signatures, the second public key certificate 54 cannot be used as the key for search as the second public key certificate 54 is common data to the group (the anonymous communication system) that does not depend on the user. However, due to the function of a group signature, the second signature key 42 can be identified based on the signature data attached to the query information by using an administrator key, which is the administrator's secret. The user registration data can be identified by linking the identification information of the second signature key 42 in advance to the user registration data in the user data registration unit 24.

Subsequently, the administrator computer 21 determines whether or not information capable of uniquely identifying the user is included in the user registration data that has been read out (S205). For example, if user registration was made by presenting the first public key certificate 53 that contains user-specific identification information and a first public key certificate 53 containing a unique_public key, for example, a public key certificate compliant with ITU-T X.509, the identification information of the user can be obtained from that first public key certificate 53. Then, if unique identification information is included in the receipt data 44, the user identification unit 25 extracts information that identifies the user from the identification information (S206) to terminate the user identification procedure (S208). On the other hand, if no unique identification information is included in the receipt data 44, the user query unit 26 makes a query about the identify of the user by presenting the receipt data 44, which is doubly signed data, and the first public key certificate 53 to the administrator of a different anonymous or non-anonymous communication system (S207) and thereafter terminates the user identification procedure (S208).

Therefore, according to the anonymous communication system 10 of this embodiment, even if the system itself does not hold specific information to identify the user, it can use the first signature key 41 in the doubly signed receipt data 44 to make a query to the administrator of a different communication system about the identify of the problematic user and uses the user data obtained by the query to enhance the security of that anonymous communication system 10, thus further solidifying the social credibility of the system.

Figure 9:
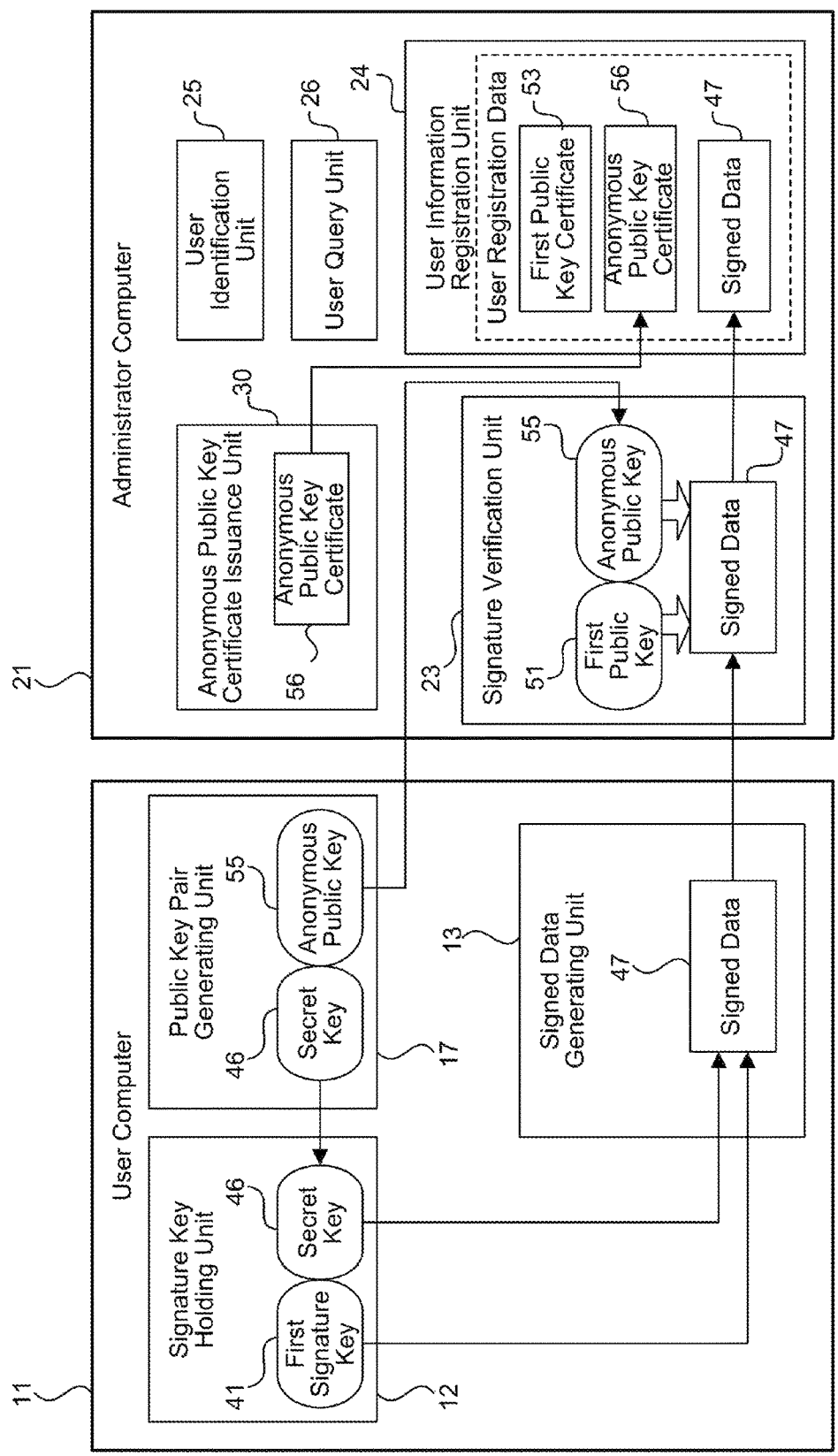
FIG. 9 is a block diagram showing another embodiment of the anonymous communication system.
Figure 10:
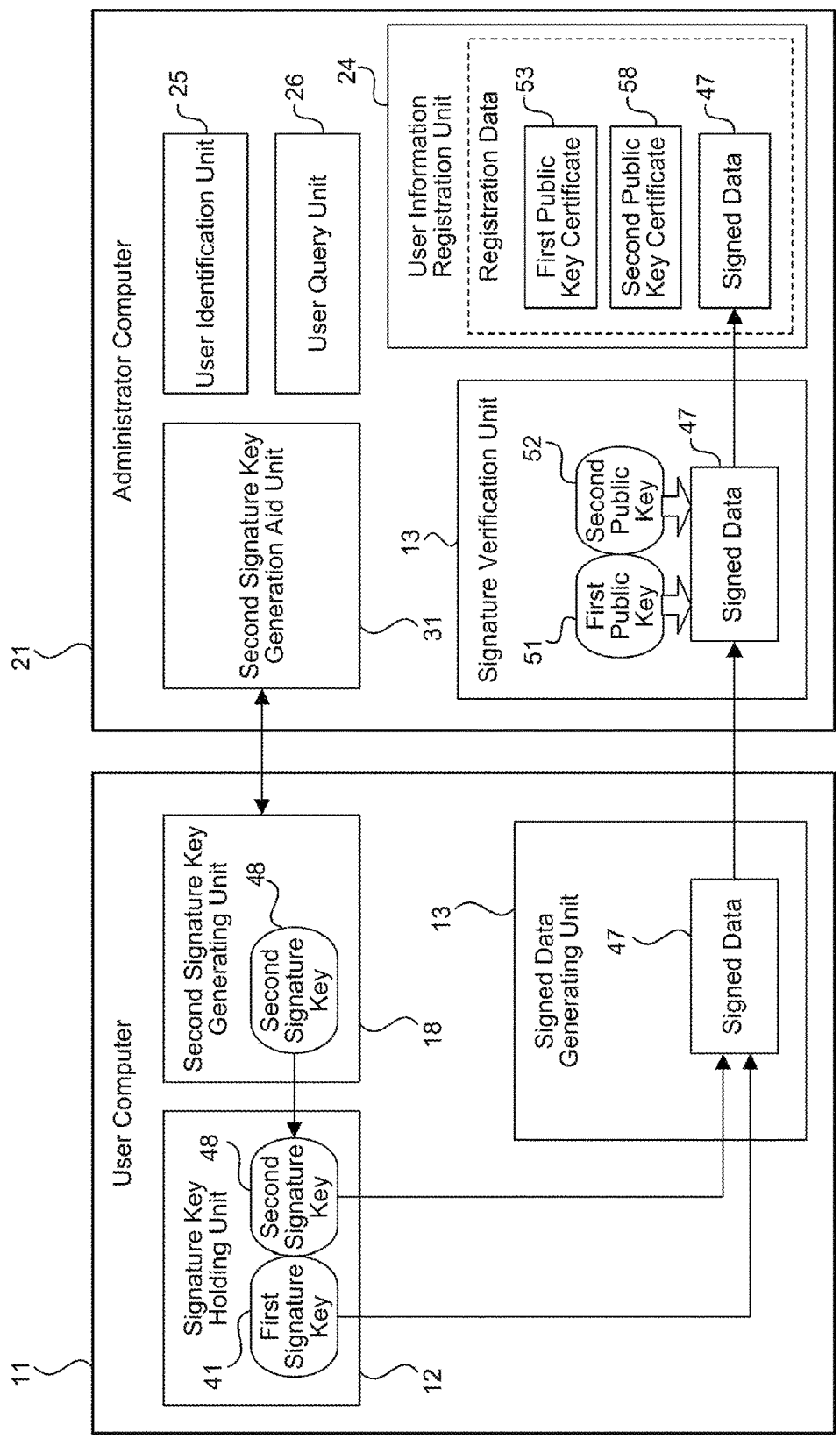
FIG. 10 is a block diagram showing still another embodiment of the anonymous communication system.

FIG. 9 and FIG. 10 shows different embodiments of the anonymous communication system, in each of which the user computer 11, rather than the administrator computer 21, is configured to generate the second signature key. The remainder of the configuration is identical with the foregoing embodiment, so that like reference characters are marked on the drawings and redundant description is omitted so as to describe the differences below.

In the anonymous communication system shown in FIG. 9, the user computer 11 is provided with a public key pair generating unit 17 as a means to generate a public key pair specific to a user. A public key pair consists of a secret key (or a personal key) 46 specific the user and an anonymous public key 55 paired with the secret key 46. The administrator computer 21 is provided with an anonymous public key certificate issuance unit 30 as a means to issue an anonymous public key certificate 55 for the anonymous public key 55 without including identification information of the user. Furthermore, when subscribing to the anonymous communication system 10, the user computer 11 is configured to use the first signature key 41 and the secret key 46, which is the second signature key, to doubly sign data that includes the anonymous public key 55 to make it signed data 47 and provide the signed data 47 to the administrator computer 21. Normally, when requesting a certificate authority to issue a public key certificate, a certificate signing request (Certificate Signing Request, CSR) is generated and sent to the certificate authority. Normally, a certificate signing request includes identification information of the owner of the key and the public key to be contained on the certificate and is signed with the corresponding signature key. The signed data 47 of the present invention does not include identification information of the user and may be data signed with the secret key 46 and additionally affixed with a signature by the first signature key 41. The anonymous public key certificate 56 generated by the administrator is used as the second public key certificate and the anonymous public key 55 is used as the second public key.

The anonymous communication system shown in FIG. 10, the user computer 11 is provided with a second signature generating unit 18 that generates a second signature key 48 that can be verified with the second public key 52 through communication with the administrator computer 21 and a signature key holding unit 12 that keeps the generated second 48 secret from the system administrator. On the other hand, the administrator computer 21 is provided with a second signature key generation aid unit 31 that aids the generation of the second signature key 48 through communication with the user computer 11. Furthermore, when subscribing to the anonymous communication system 10, the user computer 11 is configured to provide the administrator computer 21 with the signed data 47 doubly signed with the second signature key 48 made by the user computer 11 itself and the first signature key 41.

According to the anonymous communication systems shown in FIG. 9 and FIG. 10, as the user computer 11 itself is configured to generate the second signature key, the secret key 46 or the second signature key 48 used in that anonymous communication system can be kept secret from the system administrator, thereby more strictly satisfying non-repudiation compared with the above-described embodiment. That is, in the above-described embodiment, as the second signature key is shared by the user and the administrator, when signed data is provided, it is not possible to deny the fact a malicious administrator poses as the user and makes a signature. On the other hand, in the embodiments of FIG. 9 and FIG. 10, as the second signature key is a secret known only to the user, non-repudiation is strictly realized.

INDUSTRIAL APPLICABILITY

As described in detail above, according to the present invention, as a high degree of anonymity and strict non-repudiation are guaranteed, the anonymous communication system of the present invention may be put to practical use in a variety of industrial fields. As examples of practical use, a library system and online auction will be described hereinafter.

To operate a library, protection of privacy of individuals in the loan service is important for protecting freedom of creed as provided in the Constitution. Before the introduction of computers, methods, such as the Browne issue system and the reverse Browne issue system were used. In the Browne issue system, library users are issued with bag-like borrowing cards that carry their names, contact addresses, etc., while the libraries prepare book cards that carry bibliographic information. When a book is loaned, the book card is inserted in a borrowing card and stored until it is returned. When the book is returned, only the borrowing card is returned to the user. According to this method, once the book is returned, no record at all of borrowing the book remains, thereby allowing for the protection of privacy, and while the book is on loan, the library can learn who is borrowing the book to be able to take appropriate action when a problem occurs, such as issuing a demand if the return date has passed. The reverse Browne issue system is a system in which the forms of the borrowing card and the book card are reversed. Whether the Browne issue system or the reverse Browne issue system is used, it is possible to know the relationship between books and their users during the loan periods, and as it is therefore possible to illegally obtain record during these periods, it is not that privacy can be perfectly protected. Since the introduction of computers, these methods are no longer used; however, it is possible to emulate these methods with computers. In that case, however, not only is it impossible to competently protect the privacy of the users by common methods, but the danger, such as intrusion into the computer system from outside, also increases and identifying the perpetrators is more difficult.

By using the present invention, it is possible to provide a fundamental solution to this problem. The example described below is made up of a main system shared by all the libraries and individual systems separately operated by the libraries. The function of the main system is to manage the identification information of the users and the function of the individual systems is to perform book loan service of the libraries. First, a user registers with the main system by identifying himself/herself. If registration is made using a basic resident register card, that is, if the public key certificate recorded on this card is used as the user identification information, the registration can be made online over the Internet. If a document made of a paper medium, such as a driver's license or a health insurance card, is used for identification, registration is made face-to-face at a library. If the user has passed the examination for registration, the main system generates a signature key for group signatures specific to this user. This group signature key is referred to as a "common signature key." The common signature key is recorded on a new IC card on which no data at all is recorded and sent or personally handed to the user. This IC card is referred to as a "common library use card." Registration with the main system may be made only once to use any library unless there is a change in the identification information, such as the name, the address, etc.

Next, the user registers with the library that he/she wishes to use. For example, a case is considered in which a library managed by a local government, such as a municipality, is to be used. The user visits an applicable library (referred to as an individual library hereinafter). The library prompts the user to sign registration application data with the common signature key recorded on the user's common library use card and sends the signed registration application data to the main system online. As the individual library is a service provided by a specific local government, the purpose of this is to confirm that the user who has made an application belongs to the specific local government. Due to the characteristics of a group signature, the main system identifies the user based on the signature on the registration application data and replies, based on the address information, to the individual library whether or not the user has an address in the area of this local government only. The individual library confirms that the user has an address in the applicable area and performs registration. To perform registration, a user-specific group signature key is generated based on the group signature and record it on the common library use card of the user. This group signature key is referred to as an "individual signature key." At this time, an individual signature key receipt data is created and recorded in the system along with the double signatures with the common signature key and the individual signature key of the user.

To borrow a book from the library, the user presents the common library use card. The library creates loan data of that library, prompts the user to sign that loan data with the individual signature key issued by that library, and also examines the signature with the group public key of that library. Only if the signature can be verified, that data is recorded along with the signature. As the signature is according to a group signature, no information can be leaked that identifies the individual user in the signing process, so that the borrower of the book cannot be determined.

On the other hand, if it is necessary to identify the user who borrowed a book, such as when the book has not been returned past the return date, the individual signature key receipt data of that user is identified from the signature on the loan data. This is possible due to the characteristics of the group signature. As the individual signature key receipt data is also signed with the common signature key of that user, if the individual signature key receipt data is sent to the main system along with the signature, the main system can search for the registered identification information of that user. Only if the request for disclosure of the identity from the library is legitimate, the main system replies to the library only with the information necessary for the library to carry out its operation, from the identification information.

In the above-described example, when a book is loaned, as a signature is made with an individual signature key, which is a group signature key, the library can confirm that the registration of the user is completed but cannot identify the user. On the other hand, in the event of emergency, each library can identify their users by presenting to the main system the signature with the common signature key that is retrieved based on the signature with the individual signature key.

The following describes a system that applies the present invention to online auction. This system is composed of a main system that provides "venues" for a plurality of auction organizers and organizer systems that organize auctions. First, a participant of an auction registers with the main system to become a member. To register, the participant identifies himself/herself using a public key certificate issued by an authority or a financial institution, such as a basic resident register card and a signature key. This signature key is referred to as a "basic signature key." On the other hand, after the identity is confirmed, the basic system issues a group signature to the participant, and this group signature key is referred to as a "member signature key." When registering the participant, the main system records member signature key receipt data doubly signed with the basic signature key and the member signature key in the system. As the receipt data is signed with the basic signature key, it serves as information to identify the member while providing non-repudiation of the receipt of the member signature key by the member.

To take part in a particular auction, the participant registers with the organizer system of the particular auction. The member signature key is used to register. The main system issues a participant signature key, which is a group key, to the member, and, at that time, requires the member to sign participant signature key receipt data with both the participant signature key and the member signature key. The signed receipt data is recorded in the organizer system.

A participant in an auction may participate in the auction anonymously. That is to say, in bidding, bidding data including a bidding price is signed with the participant signature key and sent to the organizer. As the participant signature key is a group signature key, nobody but the organizer can track the bidder (therefore, the anonymity is naturally guaranteed). On the other hand, as the member signature key is also a group signature key, the organizer can track the bidder in his/her own auction but cannot identify the bidder. Moreover, tracking is not possible in auctions not organized by him/her.

When the auction is finished with the successful bidder determined, the organizer identifies the participant signature key receipt data recorded in the organizer system based on the signature with the participant signature key on the bidding data, and sends it to the main system. As the receipt data is signed with the member signature key, the main system alone can identify the member signature key receipt data based on the signature. As the receipt data contains the identification information of the member, the organizer of the auction is replied with that information. The organizer requests payment and delivers the bid article to the successful bidder based on the identification information.

Should the successful bidder try to repudiate his/her successful bidding, non-repudiation is applied to deny the claim. That is, as the member signature key receipt data is affixed with a signature that can be verified with a public key certificate issued by an authority, the successful bidder cannot repudiate his/her ownership of the member signature key. Next, as the participant signature key receipt data is signed with that member key, his/her ownership of the participant signature key cannot be repudiated. Lastly, the bidding data is signed with that participant signature key, the specifics of the bidding, in particular, the fact of successful bidding, cannot be repudiated.

The present invention is not limited to the foregoing embodiments and can still be carried out with the arrangements of various parts altered, without departing from the spirit of the present invention, for example, by configuring a single anonymous communication system or configuring a compound communication system that combines a variety of anonymous communication systems with different purposes of communication.

LEGENDS

1 First anonymous communication system
2 Second anonymous communication system
3 Third anonymous communication system
10 Anonymous communication system
11 User computer
12 Signature key holding unit
13 Signed data generating unit
17 Public key pair holding unit
18 Second signature key generating unit
21 Administrator computer
22 Second signature key generating unit
23 Signature verification unit
24 User data registration unit
25 User identification unit
26 User query unit
30 Anonymous public key certificate issuance unit
40 Internet
41 First signature key
42 Second signature key
43 Subscription application data
44 Receipt data (signed data)
46 Secret key of a public key pair
47 Signed data
48 Second signature key
51 First public key
52 Second public key
53 First public key certificate
54 Second public key certificate
55 Anonymous public key of a public key pair
56 Anonymous public key certificate
57 Second public key
58 Second public key certificate
100 Compound anonymous communication system

The invention claimed is:

1. An anonymous communication system that is one of a plurality of communication systems wherein a main system that holds information uniquely determining an identity of a user serves as a starting point, the plurality of communication systems chained together by being linked to one another via predetermined data, the anonymous communication system being characterized by comprising:
a user computer operated by the user and an administrator computer operated by an administrator of the anonymous communication system;
wherein the user computer includes a means to generate signed data doubly affixed with electronic signatures by a user-specific first signature key for generating a signature that can be verified by a first public key that proves the user's belonging to the main system or one of the plurality of communication systems different from the anonymous communication system and by a user-specific second signature key for generating a signature that can be verified by a second public key that proves the user's belonging to the anonymous communication system so as to indicate that the owner of the second signature key is the same as the owner of the first signature key; and wherein the administrator computer includes a means to verify the electronic signatures with a first public key certificate that carries the first public key and a second public key certificate that carries the second public key, and a user data registration means to register user data that includes the signed data for which the validity of the electronic signatures has been verified, wherein the predetermined data is the user data.

2. The anonymous communication system according to claim 1, further comprising a means to generate and provide a different second signature key for each user to the user computer.

3. The anonymous communication system according to claim 1, wherein the user computer further comprises a means to generate the secret key of a user-specific public key pair as the second signature key, and wherein the administrator computer further includes a means to issue, for the public key of the public key pair, an anonymous public key certificate that does not include identification information of the user as the second public key certificate.

4. The anonymous communication system according to claim 1, wherein the user computer further comprises: a means to generate, through communication with the administrator computer, the second signature key that can be verified with the second public key; and a means to keep the second signature key secret from the administrator.

5. The anonymous communication system according to claim 1, wherein the user data registered in the user data registration means includes the first public key certificate.

6. The anonymous communication system according to claim 5, wherein the first public key certificate includes information that uniquely identifies the user, and the administrator is capable of identifying the user based on the first public key contained on the first public key certificate.

7. The anonymous communication system according to claim 5, wherein the first public key certificate does not include information that uniquely identifies the user, and the administrator is incapable of identifying the user based on the first public key contained on the first public key certificate.

8. The anonymous communication system according to claim 1, wherein the second signature key is a signature key for group signatures, and the administrator is incapable of identifying the user based on the electronic signature by the second signature key.

9. The anonymous communication system according to claim 1, wherein the second signature key is a signature key different for each user, and while the second public key, which is paired with the second signature key, is contained on a second public key certificate and made public, as no information that uniquely identifies the user is contained on the second public key certificate or as a pseudonym of the user rather than information uniquely identifies the user is contained on the second public key certificate, the administrator is incapable of identifying the user based on the electronic signature by the second signature key.

10. The anonymous communication system according to claim 1, wherein the administrator computer further includes: a means to read out the user data from the user data registration means; a means to, if information capable of uniquely identifying the user is included in the read-out user data, identify the user based on that information; and a means to, if no information capable of uniquely identifying the user is included in the read-out user data, make a query about the identify of the user to an administrator of a different communication system by presenting the signed data prepared by the user.

11. A compound anonymous communication system characterized by comprising a first anonymous communication system that comprises the anonymous communication system according to claim 1 and a second anonymous communication system that comprises the anonymous communication system according to claim 1, wherein the second signature key of the first anonymous communication system is used as the first signature key of the second anonymous communication system.

12. The compound anonymous communication system according to claim 11, wherein the administrator computer of the second anonymous communication system further comprises: a means to identify the signed data prepared by a user who has subscribed to the second anonymous communication system from the user data registration means; and a means to make a query to the administrator of the first anonymous communication system about the identify of the user who has subscribed by presenting the identified signed data.

13. A method performed by a user computer operated by a user and an administrator computer operated by an administrator of an anonymous communication system to cause the user to subscribe to the anonymous communication system, the anonymous communication system being one of a plurality of communication systems wherein a main system that holds information uniquely determining an identity of a user serves as a starting point, the plurality of communication systems chained together by being linked to one another via predetermined data, the method being characterized by comprising the steps of:

the user computer generating signed data doubly affixed with electronic signatures by a user-specific first signature key for generating a signature that can be verified by a first public key that proves the user's belonging to the main system or one of the plurality of communication systems different from the anonymous communication system and by a user-specific second signature key for generating a signature that can be verified by a second public key that proves the user's belonging to the anonymous communication system so as to indicate that the owner of the second signature key is the same as the owner of the first signature key; and providing the signed data from the user computer to the administrator computer;

the administrator computer verifying the electronic signatures with a first public key certificate that carries the first public key and a second public key certificate that carries the second public key, and the administrator computer registering user data that includes the signed data when the validity of the electronic signatures is verified;

wherein the predetermined data is the user data.

14. The method according to claim 13, wherein the second signature key is generated by the administrator computer and provided to the user computer from the administrator computer.

15. The method according to claim 14, wherein the administrator computer provides the second signature key to the user computer after verifying the first signature key provided by the user computer.

16. The method according to claim 13, wherein the second signature key is the secret key of a user-specific public key pair and provided by the user computer to the administrator computer, and wherein the administrator computer issues an anonymous public key certificate for the public key of the public key pair as the second public key certificate, the anonymous public key certificate not including identification information of the user.

17. The method according to claim 13, wherein the second signature key is generated by the user computer through communication with the administrator computer so as to be verifiable by the second public key, the second signature key being kept secret from the administrator.

18. The method according to claim 13, wherein the second signature key is a signature key for group signatures and generated according to a generation procedure for generating a signature key for group signatures.

* * * * *